(12) United States Patent
Ohki

(10) Patent No.: US 8,963,706 B2
(45) Date of Patent: Feb. 24, 2015

(54) DIRECTION INDICATING APPARATUS

(75) Inventor: Isao Ohki, Hanno (JP)

(73) Assignee: Shindengen Electric Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 14/003,216

(22) PCT Filed: Aug. 6, 2012

(86) PCT No.: PCT/JP2012/069993
§ 371 (c)(1),
(2), (4) Date: Sep. 4, 2013

(87) PCT Pub. No.: WO2014/024246
PCT Pub. Date: Feb. 13, 2014

(65) Prior Publication Data
US 2014/0232283 A1    Aug. 21, 2014

(51) Int. Cl.
*B60Q 1/34* (2006.01)
*B60Q 1/38* (2006.01)
*B60Q 1/46* (2006.01)
*H05B 33/08* (2006.01)

(52) U.S. Cl.
CPC .. *B60Q 1/38* (2013.01); *B60Q 1/46* (2013.01); *H05B 33/0809* (2013.01)
USPC ... 340/475; 340/426.1; 340/471; 340/815.45; 315/201; 315/193; 315/224

(58) Field of Classification Search
USPC .......... 315/201, 185, 200, 193, 224; 340/475, 340/815.45
See application file for complete search history.

(56) References Cited

U.S. PATENT DOCUMENTS

| | | | | |
|---|---|---|---|---|
| 5,790,017 A | * | 8/1998 | Berryhill | 340/475 |
| 7,005,978 B2 | * | 2/2006 | Takeuchi et al. | 340/475 |
| 7,026,768 B1 | * | 4/2006 | Ruiz | 315/185 R |
| 2002/0047531 A1 | * | 4/2002 | Sugimoto et al. | 315/82 |
| 2004/0095234 A1 | * | 5/2004 | Sugimoto et al. | 340/475 |
| 2005/0073428 A1 | * | 4/2005 | Sugimoto et al. | 340/815.45 |
| 2006/0091817 A1 | * | 5/2006 | Herrig et al. | 315/200 A |
| 2007/0096893 A1 | * | 5/2007 | Kondo | 340/471 |

(Continued)

FOREIGN PATENT DOCUMENTS

| | | |
|---|---|---|
| DE | 102006042470 | 3/2008 |
| DE | 102006042470 A1 | 3/2008 |

(Continued)

OTHER PUBLICATIONS

ISR for related PCT/JP2012/069993 mailed on Nov. 6, 2012 and its English translation.

(Continued)

*Primary Examiner* — Thuy Vinh Tran
*Assistant Examiner* — Syed M Kaiser
(74) *Attorney, Agent, or Firm* — Ladas & Parry, LLP

(57) ABSTRACT

To provide a direction indicating apparatus that is less susceptible to a change of a power supply voltage and can reduce the difference in brightness of a direction indicating lamp using an LED element between a direction indicating operation and a hazard operation. A direction indicating apparatus includes a pulse signal generating part, a first switching element, a variable resistor circuit, a direction indicating switch, a hazard switch, first and second direction indicating lamps, a voltage detecting part and a lighting status detecting part.

5 Claims, 3 Drawing Sheets

(56) References Cited

U.S. PATENT DOCUMENTS

| | | | |
|---|---|---|---|
| 2007/0194905 A1* | 8/2007 | Herrig et al. | 340/471 |
| 2007/0273495 A1* | 11/2007 | Kesterson | 340/469 |
| 2008/0061956 A1* | 3/2008 | Takeuchi | 340/476 |
| 2008/0150708 A1* | 6/2008 | Takeuchi et al. | 340/426.1 |
| 2009/0184662 A1* | 7/2009 | Given et al. | 315/294 |
| 2009/0195183 A1* | 8/2009 | Yang | 315/294 |
| 2009/0273290 A1* | 11/2009 | Ziegenfuss | 315/193 |
| 2010/0045187 A1* | 2/2010 | Shteynberg et al. | 315/149 |
| 2010/0201283 A1* | 8/2010 | Kawata et al. | 315/287 |
| 2010/0220049 A1* | 9/2010 | Murakami | 345/102 |
| 2011/0169418 A1* | 7/2011 | Yang et al. | 315/291 |
| 2011/0187276 A1* | 8/2011 | Shteynberg et al. | 315/186 |
| 2012/0001546 A1* | 1/2012 | Takeuchi et al. | 315/77 |
| 2013/0147377 A1* | 6/2013 | Kubota et al. | 315/201 |
| 2013/0300297 A1* | 11/2013 | Shteynberg et al. | 315/151 |
| 2014/0015409 A1* | 1/2014 | Tetsuka et al. | 315/77 |
| 2014/0016336 A1* | 1/2014 | Takenaka et al. | 362/473 |
| 2014/0049973 A1* | 2/2014 | Adachi et al. | 362/465 |
| 2014/0232283 A1* | 8/2014 | Ohki | 315/210 |
| 2014/0232285 A1* | 8/2014 | Ohki | 315/210 |

FOREIGN PATENT DOCUMENTS

| | | |
|---|---|---|
| JP | S64-90831 A | 4/1989 |
| JP | 02-283539 | 11/1990 |
| JP | H02-283539 A | 11/1990 |

OTHER PUBLICATIONS

International Search Report for PCT/JP2012/069993 mailed on Nov. 6, 2012.

* cited by examiner

US 8,963,706 B2

DIRECTION INDICATING APPARATUS

CROSS-REFERENCE TO RELATED APPLICATIONS

This application is the U.S. National Stage of International Patent Application No. PCT/JP2012/069993, filed on Aug. 6, 2012, the disclosure of which is hereby incorporated by reference in its entirety.

TECHNICAL FIELD

The present invention relates to a direction indicating apparatus that uses an LED element as a direction indicating lamp.

BACKGROUND ART

FIG. 3 shows a known direction indicating apparatus for an automobile or a motorcycle. The direction indicating apparatus uses bulbs as direction indicating lamps (blinkers) 102L and 102R.

For example, when a direction indicating switch "SW1" is switched to an L terminal side, an oscillator 104a generates an oscillation pulse signal. A buffer 104b buffers the oscillation pulse signal and outputs a pulse signal. An N-type MOS transistor "NM101" flows a drive current having a magnitude of the amplitude of the pulse signal supplied to the gate thereof from the drain to which a power supply voltage "VDD" to the source. The drive current flows to bulbs 102LF and 102LR of the direction indicating lamp 102L via a current detecting resistor "R101" and the direction indicating switch "SW1". In this way, a direction indicating operation occurs in which the direction indicating lamp 102L blinks at the frequency of the oscillation pulse signal. If a hazard switch "SW2" is turned on, the drive current flows to the direction indicating lamps 102L and 102R via the hazard switch "SW2", and a hazard operation occurs in which all the direction indicating lamps 102L and 102R blink. In the hazard operation, the drive current is higher than in the direction indicating operation, and the current flowing to the direction indicating lamps 102L and 102R does not significantly change compared with that in the direction indicating operation.

It is known that the power supply voltage from a battery "B" used in a motorcycle or the like significantly changes with the status of the motorcycle body. For example, in a 12V system, the power supply voltage changes approximately from 8V to 15V. In addition, the bulb has a characteristic that the temperature of the filament in the bulb increases as the voltage increases, and the current flowing through the bulb decreases as the resistance of the filament increases. Therefore, even if the power supply voltage increases, the current flowing through the bulb does not significantly increases, and therefore, there is no practical problem.

In JP1-90831A, another known direction indicating apparatus similar to the direction indicating apparatus described above is described.

In recent years, there has been a demand that an LED element be used instead of the bulb as the direction indicating lamp of the direction indicating apparatus in order to improve the styling of the automobile or reduce the power consumption of the electronic equipment. The LED element has a characteristic that the current increases as the voltage increases. As described above, the power supply voltage can significantly change. If the current is regulated with respect to low power supply voltages, a high power supply voltage can lead to a damage to the LED element because the current increases to cause the LED element to generate heat or because the current exceeds the rated current. If the current is regulated with respect to high power supply voltages, a low power supply voltage can lead to a darkening or turning off of the LED element because the current decreases. In order to elongate the service life of the LED element and keep a constant brightness, it is required to provide a constant current circuit that keeps the current flowing through the LED element constant even if the power supply voltage changes.

However, in the hazard operation, the number of direction indicating lamps serving as loads increases twice to four compared with the number of direction indicating lamps in the direction indicating operation. Therefore, if the constant current circuit is provided, there is a problem that the current flowing through the LED element in each direction indicating lamp decreases to approximately half of the current in the direction indicating operation, and the LED element darkens.

DISCLOSURE OF THE INVENTION

An object of the present invention is to provide a direction indicating apparatus that is less susceptible to a change of a power supply voltage and can reduce the difference in brightness of a direction indicating lamp using an LED element between a direction indicating operation and a hazard operation.

A direction indicating apparatus according to an embodiment comprising:

a pulse signal generating part that generates a pulse signal;

a first switching element having a first end to which a power supply voltage is supplied, a control terminal to which the pulse signal is supplied and a second end at which a drive current having a magnitude responsive to an amplitude of the pulse signal is output;

a variable resistor circuit that is connected to the second end of the first switching element at a first end thereof and is capable of switching a resistance between a first resistance and a second resistance, the second resistance being lower than the first resistance;

a direction indicating switch that has a first terminal, a second terminal and a third terminal and is capable of switching among a state where the first terminal and the second terminal are electrically connected to each other, a state where the first terminal and the third terminal are electrically connected to each other and a state where the first terminal, the second terminal and the third terminal are electrically separated from each other, the first terminal being connected to the second end of a variable resistor circuit;

a hazard switch that is capable of switching between an on state where the first terminal, the second terminal and the third terminal of the direction indicating switch are electrically connected to each other and an off state where the first terminal, the second terminal and the third terminal are electrically separated from each other;

a first direction indicating lamp that includes a first LED element, is connected to the second terminal at a first end thereof and to a ground at a second end thereof and is turned on when a current flows therethrough;

a second direction indicating lamp that includes a second LED element, is connected to the third terminal at a first end thereof and to the ground at a second end thereof and is turned on when a current flows therethrough;

a voltage detecting part that detects a detection voltage between the ends of the variable resistor circuit and makes the pulse signal generating part control the amplitude of the pulse signal so as to bring the detection voltage responsive to a pulse wave of the pulse signal close to a preset target voltage value; and a lighting status detecting part that detects lighting status of the first direction indicating lamp and the second direction indicating lamp and switches the resistance of the variable resistor circuit to the second resistance when both the first direction indicating lamp and the second direction indicating lamp are turned on and switches the resistance of the variable resistor circuit to the first resistance when any of the first direction indicating lamp and the second direction indicating lamp is turned on.

In the direction indicating apparatus, the first resistance is set to be twice as high as the second resistance.

In the direction indicating apparatus, the variable resistor circuit has:

a first resistor connected to the second end of the first switching element at a first end thereof;

a second resistor connected to a second end of the first resistor at a first end thereof and to the first terminal of the direction indicating switch at a second end thereof; and a second switching element that electrically connects the ends of the first resistor to each other when the second switching element is turned on, and electrically separates the ends of the first resistor from each other when the second switching element is turned off, and the resistance of the variable resistor circuit is the first resistance when the second switching element is turned off, and is the second resistance when the second switching element is turned on.

In the direction indicating apparatus, the lighting status detecting part detects that the first direction indicating lamp is turned on if a voltage at the first end of the first direction indicating lamp is equal to or higher than a first threshold voltage, detects that the first direction indicating lamp is not turned on if the voltage at the first end of the first direction indicating lamp is lower than the first threshold voltage, detects that the second direction indicating lamp is turned on if a voltage at the first end of the second direction indicating lamp is equal to or higher than a preset second threshold voltage and detects that the second direction indicating lamp is not turned on if the voltage at the first end of the second direction indicating lamp is lower than the second threshold voltage.

In the direction indicating apparatus, the second switching element is a P-type MOS transistor having a source connected to the first end of the first resistor and a drain connected to the second end of the first resistor, and the lighting status detecting part has:

a third resistor connected to the source of the P-type MOS transistor at a first end thereof and to a gate of the P-type MOS transistor at a second end thereof;

a third switching element that has a first end connected to the second end of the third resistor and a control terminal connected to the first end of the second direction indicating lamp and is turned on when the voltage at the first end of the second direction indicating lamp is equal to or higher than the second threshold voltage; and a fourth switching element that has a first end connected to a second end of the third switching element, a control terminal connected to the first end of the first direction indicating lamp and a second end grounded and is turned on when the voltage at the first end of the first direction indicating lamp is equal to or higher than the first threshold voltage.

According to the present invention, the lighting status detecting part switches the resistance of the variable resistor circuit to the second resistance lower than the first resistance when both the first direction indicating lamp and the second direction indicating lamp are turned on and switches the resistance of the variable resistor circuit to the first resistance when any of the first direction indicating lamp and the second direction indicating lamp is turned on. The voltage detecting part makes the pulse signal generating part control the amplitude of the pulse signal so as to bring the detection voltage between the opposite ends of the variable resistor circuit responsive to the pulse wave of the pulse signal close to the preset target voltage value. As a result, in the hazard operation, the constant current control occurs with a higher drive current than in the direction indicating operation, so that the difference in the amount of the current flowing through the direction indicating lamps between the direction indicating operation and the hazard operation can be reduced.

As a result, the direction indicating apparatus can be made less susceptible to a change of a power supply voltage and can reduce the difference in brightness of a direction indicating lamp using an LED element between a direction indicating operation and a hazard operation.

MODE FOR CARRYING OUT THE INVENTION

In the following, an embodiment of the present invention will be described with reference to the drawings.

FIRST EMBODIMENT

Figure 1:
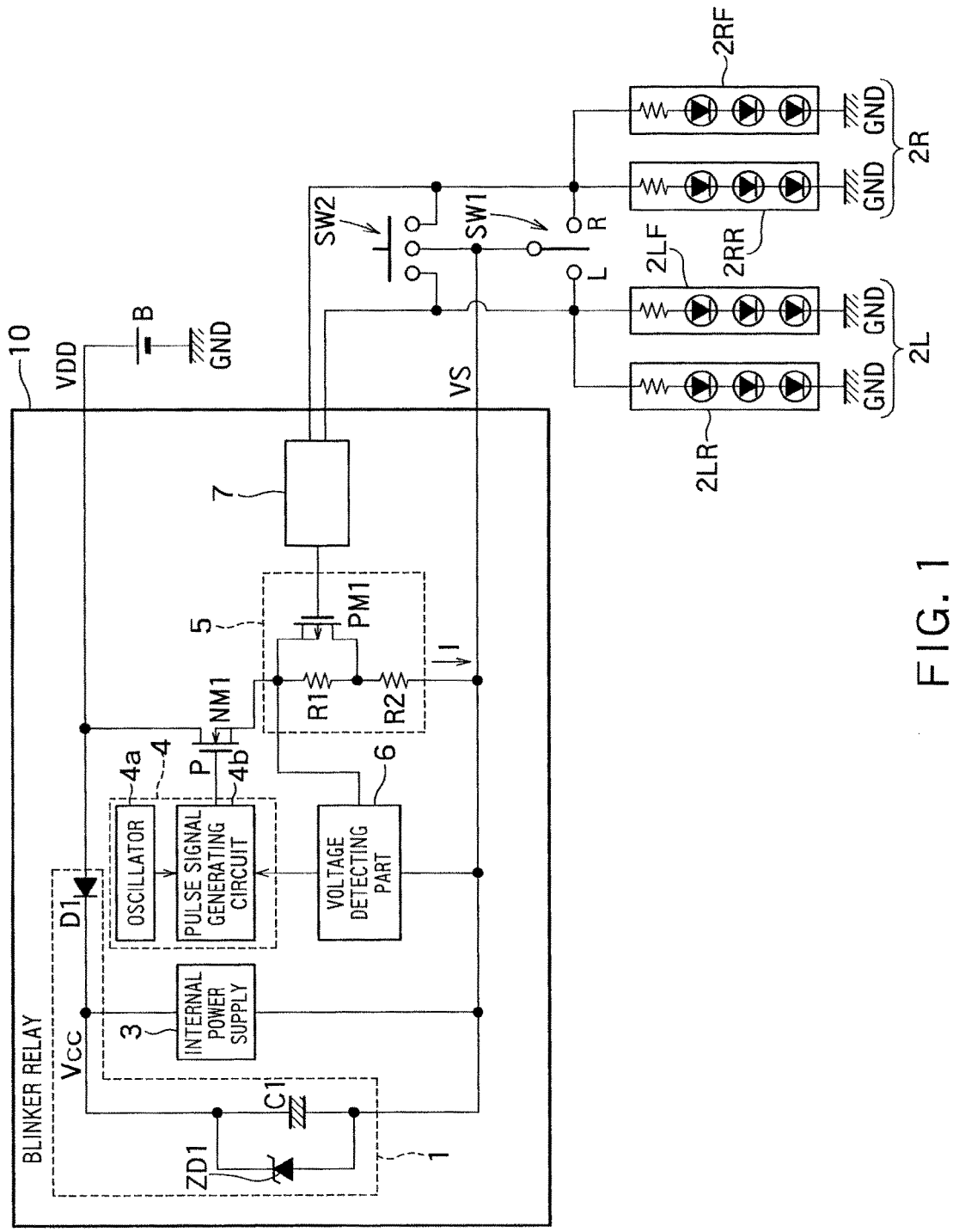
FIG. 1 is a circuit diagram showing a direction indicating apparatus according to a first embodiment of the present invention.

FIG. 1 is a circuit diagram showing a direction indicating apparatus according to a first embodiment of the present invention. As shown in FIG. 1, the direction indicating apparatus includes a bootstrap circuit 1, a direction indicating switch "SW1", a hazard switch "SW2", a first direction indicating lamp "2L", a second direction indicating lamp "2R", an internal power supply 3, a pulse signal generating part 4, an N-type MOS transistor (a first switching element) "NM1", a variable resistor circuit 5, a voltage detecting part 6 and a lighting status detecting part 7. The direction indicating apparatus is used for a motorcycle, for example.

The bootstrap circuit 1, the internal power supply 3, the pulse signal generating part 4, the N-type MOS transistor "NM1", the variable resistor circuit 5, the voltage detecting part 6 and the lighting status detecting part 7 form a blinker relay (a direction indicating lamp controlling apparatus) 10.

The bootstrap circuit 1 has a diode (a rectifying element) "D1", a capacitive element "C1" and a Zener diode "ZD1". A power supply voltage "VDD" from a power supply (a battery) "B" is applied to an anode (one end) of the diode "D1". The capacitive element "C1" is connected to a cathode (another end) of the diode "D1" at one end thereof and to a first terminal of the direction indicating switch "SW1" at another end thereof. The Zener diode "ZD1" is connected to the one end of the capacitive element "C1" at a cathode thereof and to the another end of the capacitive element "C1" at an anode thereof.

The direction indicating switch "SW1" has the first terminal, a second terminal (an L terminal) and a third terminal (an R terminal). The direction indicating switch "SW1" is capable of switching among a state where the first terminal and the second terminal are electrically connected to each other, a state where the first terminal and the third terminal are electrically connected to each other and a state where the first terminal, the second terminal and the third terminal are electrically separated from each other.

The hazard switch "SW2" is capable of switching between an on state where the first terminal, the second terminal and the third terminal of the direction indicating switch "SW1" are electrically connected to each other and an off state where the first terminal, the second terminal and the third terminal are electrically separated from each other.

The first direction indicating lamp "2L", which is a left direction indicating lamp, is connected to the second terminal of the direction indicating switch "SW1" at one end thereof (on an anode side thereof) and to a ground at another end thereof (on a cathode side thereof) and is turned on when a current flows thereto.

The second direction indicating lamp "2R", which is a right direction indicating lamp, is connected to the third terminal of the direction indicating switch "SW1" at one end thereof (on an anode side thereof) and to the ground at another end thereof (on a cathode side thereof) and is turned on when a current flows thereto.

The first direction indicating lamp "2L" has a left-front direction indicating lamp "2LF" and a left-rear direction indicating lamp "2LR" connected in parallel with each other. The left-front direction indicating lamp "2LF" and the left-rear direction indicating lamp "2LR" each include three first LED elements and a current limiting resistor connected in series with each other.

The second direction indicating lamp "2R" has a right-front direction indicating lamp "2RF" and a right-rear direction indicating lamp "2RR" connected in parallel with each other. The right-front direction indicating lamp "2RF" and the right-rear direction indicating lamp "2RR" each include three second LED elements and a current limiting resistor connected in series with each other.

With such a configuration, if the direction indicating switch "SW1" switches to the second terminal or the third terminal, or if the hazard switch "SW2" is turned on, a current flows from the power supply "B" to a ground "GND" via the diode "D1", the capacitive element "C1", the direction indicating switch "SW1" or the hazard switch "SW2" and at least any of the first direction indicating lamp "2L" and the second direction indicating lamp "2R". As a result, the capacitive element "C1" is charged, and the bootstrap circuit 1 generates an internal power supply voltage "Vcc", which is the voltage at the one end of the capacitive element "C1", based on a reference voltage "VS", which is the voltage at the another end of the capacitive element "C1". Even if the reference voltage "VS" changes, the voltage between the opposite ends of the capacitive element "C1" (the internal power supply voltage minus the reference voltage (Vcc−VS)) is kept substantially constant. The Zener diode "ZD1" limits the voltage between the opposite ends of the capacitive element "C1" to be equal to or lower than a Zener voltage.

The internal power supply 3 is activated by the potential difference between the internal power supply voltage "Vcc" and the reference voltage "VS" as a power supply, and generates a bias voltage with respect to the reference voltage "VS". Although not shown, the generated bias voltage is supplied to a predetermined circuit in the blinker relay 10. The bias voltage is a voltage intended for determining an operating point or the like of a circuit and is supplied to any circuit as required separately from the internal power supply voltage "Vcc".

The pulse signal generating part 4 is activated by the potential difference between the internal power supply voltage "Vcc" and the reference voltage "VS" as a power supply, and generates a pulse signal "P" at a predetermined frequency (1.42 Hz, for example). For example, the pulse signal "P" is a rectangular wave, and the duty cycle of the pulse "P" is approximately 50%. Specifically, the pulse signal generating part 4 has an oscillator 4a and a pulse signal generating circuit 4b.

The oscillator 4a generates an oscillation signal. The pulse signal generating circuit 4b generates the pulse signal "P" by amplifying and frequency-dividing the oscillation signal from the oscillator 4a. The pulse signal "P" can have an amplitude ranging from that of the reference voltage "VS" to that of the internal power supply voltage "Vcc".

The N-type MOS transistor "NM1" has a drain (one end) to which the power supply voltage "VDD" is supplied, a gate (a control terminal) to which the pulse signal "P" is supplied, and a source (another end) at which a drive current "I" having a magnitude responsive to the amplitude of the pulse signal "P".

The variable resistor circuit 5 is connected to the source of the N-type MOS transistor "NM1" at one end thereof and to the first terminal of the direction indicating switch "SW1" at another end thereof. The variable resistor circuit 5 is capable of switching the resistance between the one end and the another end between a first resistance and a second resistance. The first resistance is set to be approximately twice as high as the second resistance.

More specifically, the variable resistor circuit 5 has a first resistor "R1", a second resistor "R2" and a P-type MOS transistor (a second switching element) "PM1".

The first resistor "R1" is connected to the source of the N-type MOS transistor "NM1" at one end thereof. The second resistor "R2" is connected to another end of the first resistor "R1" at one end thereof and to the first terminal of the direction indicating switch "SW1" at another end thereof.

The P-type MOS transistor "PM1" electrically connects the opposite ends of the first resistor "R1" to each other when the P-type MOS transistor "PM1" is turned on, and opens the connection between the opposite ends of the first resistor "R1" when the P-type MOS transistor "PM1" is turned off. The P-type MOS transistor "PM1" has a source connected to the one end of the first resistor "R1" and a drain connected to the another end of the first resistor "R1".

As can be seen from the above description, the variable resistor circuit 5 has the first resistance when the P-type MOS transistor "PM1" is turned off, and has the second resistance when the P-type MOS transistor "PM1" is turned on.

The voltage detecting part 6 detects a detection voltage between the opposite ends of the variable resistor circuit 5, that is, a detection voltage between the one end of the first resistor "R1" and the another end of the second resistor "R2", and makes the pulse signal generating part 4 control the amplitude of the pulse signal "P" so as to bring the detection voltage responsive to the pulse wave of the pulse signal "P" close to a preset target voltage value. As a result, a constant current control occurs to keep the drive current "I" responsive to the pulse wave of the pulse signal "P" at substantially constant.

The lighting status detecting part 7 detects the lighting statuses of the first direction indicating lamp "2L" and the second direction indicating lamp "2R". Depending on the detected lighting statuses, the lighting status detecting part 7 switches the resistance of the variable resistor circuit 5 to the second resistance when both the first direction indicating lamp "2L" and the second direction indicating lamp "2R" are turned on, and switches the resistance of the variable resistor circuit 5 to the first resistance when the any of the first direction indicating lamp "2L" and the second direction indicating lamp "2R" is turned on.

More specifically, the lighting status detecting part 7 detects that the first direction indicating lamp "2L" is turned on if the voltage at one end of the first direction indicating lamp "2L" is equal to or higher than a preset first threshold voltage, and detects that the first direction indicating lamp "2L" is not turned on if the voltage at the one end of the first direction indicating lamp "2L" is lower than the first threshold voltage.

Furthermore, the lighting status detecting part 7 detects that the second direction indicating lamp "2R" is turned on if the voltage at one end of the second direction indicating lamp "2R" is equal to or higher than a preset second threshold voltage, and detects that the second direction indicating lamp "2R" is not turned on if the voltage at the one end of the second direction indicating lamp "2R" is lower than the second threshold voltage.

If the first direction indicating lamp "2L" and the second direction indicating lamp "2R" have substantially the same electrical characteristics, the first threshold voltage and the second threshold voltage can be equal to each other.

The lighting status detecting part 7 can have any circuit configuration that serves the functions described above. In the following, an example of the circuit configuration will be described with reference to FIG. 2.

Figure 2:
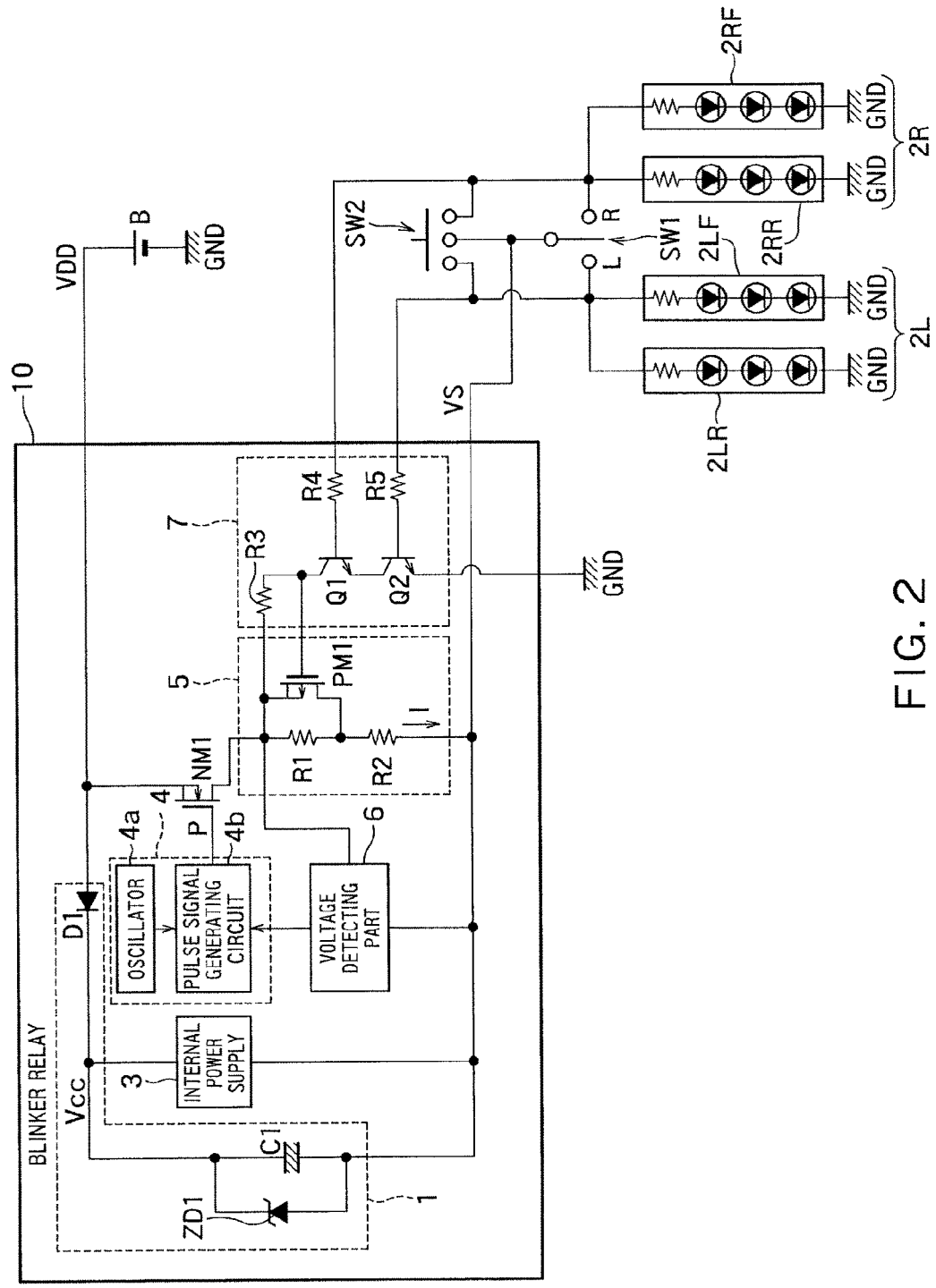
FIG. 2 is a circuit diagram of the direction indicating apparatus according to the first embodiment showing an example of the circuit configuration of the lighting status detecting part 7.
Figure 3:
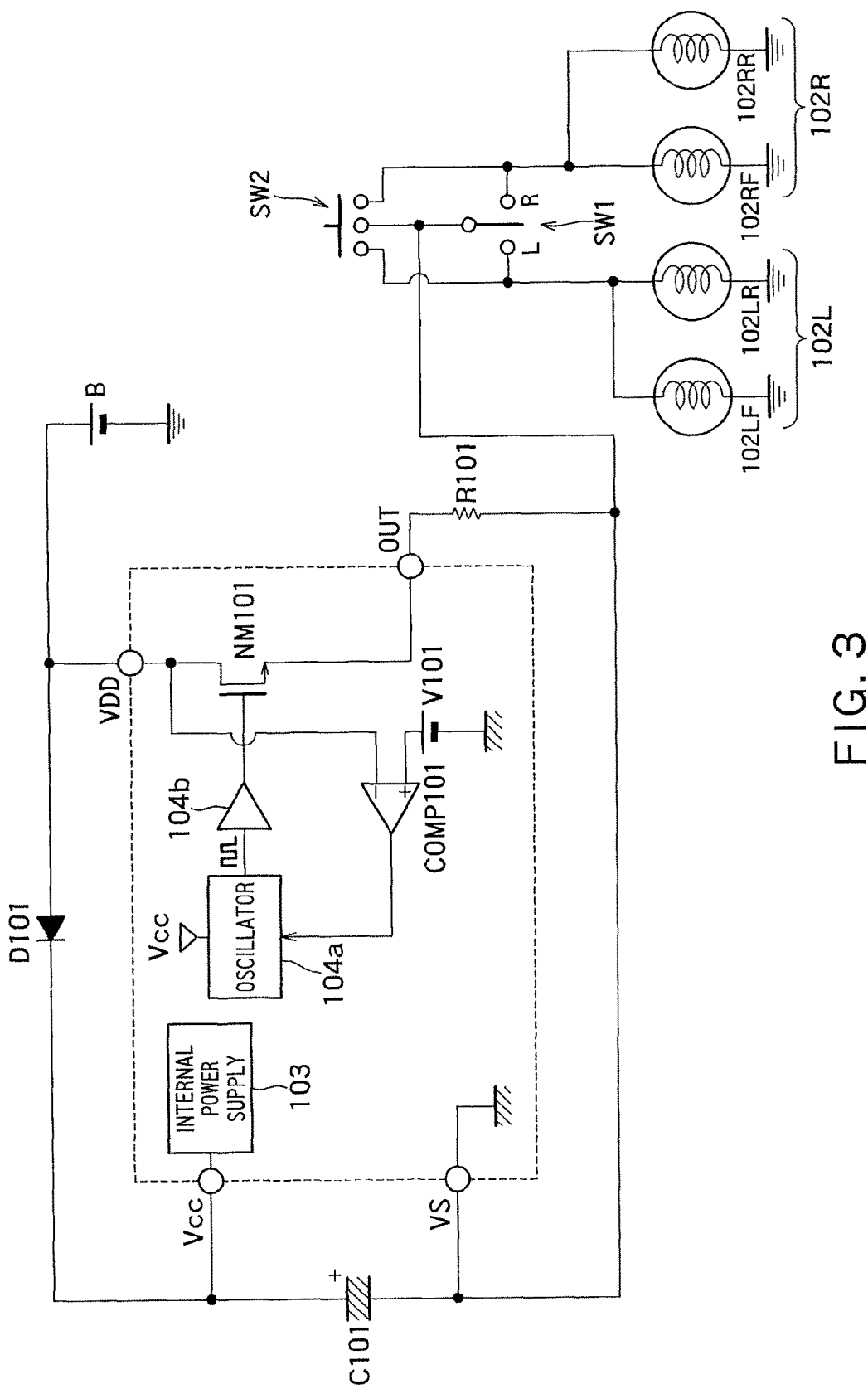
FIG. 3 is a circuit diagram showing a direction indicating apparatus according to a conventional art.

FIG. 2 is a circuit diagram of the direction indicating apparatus according to the first embodiment showing an example of the circuit configuration of the lighting status detecting part 7. The circuit configuration excluding the lighting status detecting part 7 is the same as that shown in FIG. 1 and therefore will not be further described.

As shown in FIG. 2, the lighting status detecting part 7 has a third resistor "R3", a resistor "R4", a resistor "R5", an NPN-type transistor (a third switching element) "Q1" and an NPN-type transistor (a fourth switching element) "Q2".

The third resistor "R3" is connected to the source of the P-type MOS transistor "PM1" at one end thereof and to the gate of the P-type MOS transistor "PM1" at another end thereof.

The NPN-type transistor "Q1" has a collector (one end) connected to the another end of the third resistor "R3" and a base (a control terminal) connected to the one end of the second direction indicating lamp "2R" via the resistor "R4". The NPN-type transistor "Q1" is turned on if the voltage at the one end of the second direction indicating lamp "2R" is equal to or higher than the second threshold voltage and is turned off if the voltage is lower than the second threshold voltage.

The NPN-type transistor "Q2" has a collector (one end) connected to an emitter (another end) of the NPN-type transistor "Q1", a base (a control terminal) connected to the one end of the first direction indicating lamp "2L" via the resistor "R5" and an emitter (another end) grounded. The NPN-type transistor "Q2" is turned on if the voltage at the one end of the first direction indicating lamp "2L" is equal to or higher than the first threshold voltage and is turned off if the voltage is lower than the first threshold voltage.

With such a configuration, in a direction indicating operation in which the direction indicating switch "SW1" is switched to the second terminal, and the hazard switch "SW2" is turned off, for example, the drive current "I" having a magnitude responsive to the amplitude of the pulse signal "P" flows to the first direction indicating lamp "2L" via the direction indicating switch "SW1". As a result, the first direction indicating lamp "2L" blinks at the frequency of the pulse signal "P".

While the drive current "I" flows, the voltage at the one end of the first direction indicating lamp "2L" is equal to or higher than the first threshold voltage, so that the NPN-type transistor "Q2" is turned on. However, the voltage at the one end of the second direction indicating lamp "2R", through which the drive current "I" does not flow, is lower than the second threshold voltage, so that the NPN-type transistor "Q1" is turned off. Therefore, no current flows through the resistor "R3", so that the P-type MOS transistor "PM1" is turned off, and the resistance between the opposite ends of the variable resistor circuit 5 is the first resistance. That is, the drive current "I" flows through the first resistor "R1" and the second resistor "R2" but does not flow through the P-type MOS transistor "PM1".

Similarly, in a direction indicating operation in which the direction indicating switch "SW1" is switched to the third terminal, and the hazard switch "SW2" is turned off, the second direction indicating lamp "2R" blinks at the frequency of the pulse signal "P".

While the drive current "I" flows, the voltage at the one end of the second direction indicating lamp "2R" is equal to or higher than the second threshold voltage, so that the NPN-type transistor "Q1" is turned on. However, the voltage at the one end of the first direction indicating lamp "2L", through which the drive current "I" does not flow, is lower than the first threshold voltage, so that the NPN-type transistor "Q2" is turned off. Therefore, the P-type MOS transistor "PM1" is turned off, and the resistance between the opposite ends of the variable resistor circuit 5 is the first resistance.

On the other hand, in a hazard operation in which the hazard switch "SW2" is turned on, the drive current "I" having a magnitude responsive to the amplitude of the pulse signal "P" branches at the hazard switch "SW2" to flow to both the first direction indicating lamp "2L" and the second direction indicating lamp "2R". As a result, the first and second direction indicating lamps "2L" and "2R" blink at the frequency of the pulse signal "P".

In this case, while the drive current "I" flows, the voltage at the one end of the first direction indicating lamp "2L" is equal to or higher than the first threshold voltage, and the voltage at the one end of the second direction indicating lamp "2R" is equal to or high than the second threshold voltage, so that the two NPN-type transistors "Q1" and "Q2" are turned on. Therefore, a current flows through the resistor "R3", so that the P-type MOS transistor "PM1" is turned on, and the resistance between the opposite ends of the variable resistor circuit 5 is the second resistance. That is, almost all the drive current "I" output from the N-type MOS transistor "NM1" flows through the P-type MOS transistor "PM1", and little current flows through the first resistor "R1".

Thus, the resistance between the opposite ends of the variable resistor circuit 5 is lower in the hazard operation than in the direction indicating operation, and the voltage detecting part 6 makes the pulse signal generating part 4 increase the amplitude of the pulse signal "P" compared with that in the direction indicating operation so as to bring the detection voltage between the opposite ends of the variable resistor circuit 5 responsive to the pulse wave of the pulse signal "P" close to the target voltage value.

As a result, in the hazard operation, the constant current control occurs with the drive current "I" approximately twice as high as that in the direction indicating operation, so that the currents flowing through the first and second direction indicating lamps "2L" and "2R" are substantially equal to that in the direction indicating operation. Thus, the first and second direction indicating lamps "2L" and "2R" can be prevented from darkening in the hazard operation. That is, the difference in the brightness of the first and second direction indicating lamps "2L" and "2R" turned on between the direction indicating operation and the hazard operation can be substantially eliminated.

As described above, according to this embodiment, the lighting status detecting part 7 switches the resistance of the variable resistor circuit 5 to the second resistance lower than the first resistance when both the first and second direction indicating lamps "2L" and "2R" are turned on, and switches the resistance of the variable resistor circuit 5 to the first resistance when any of the first and second direction indicating lamps "2L" and "2R" is turned on. The voltage detecting part 6 makes the pulse signal generating part 4 control the amplitude of the pulse signal "P" so as to bring the detection voltage between the opposite ends of the variable resistor circuit 5 responsive to the pulse wave of the pulse signal "P" close to the target voltage. As a result, in the hazard operation, the constant current control occurs with a higher drive current "I" than in the direction indicating operation, so that the difference in the amount of the current flowing through the first and second direction indicating lamps "2L" and "2R" to be turned on between the direction indicating operation and the hazard operation can be reduced.

The constant current control can keep the current flowing to the LED elements of the first and second direction indicating lamps "2L" and "2R" approximately constant even if the power supply voltage "VDD" changes and thus can elongate the service life of the LED elements and keep a constant brightness.

Therefore, the direction indicating apparatus is less susceptible to a change of the power supply voltage "VDD", and the difference in brightness of the first and second direction indicating lamps "2L" and "2R" turned on between the direction indicating operation and the hazard operation can be reduced.

If the second resistance is lower than the first resistance, the drive current "I" is higher in the hazard operation than in the direction indicating operation, so that the difference in the brightness of the first and second direction indicating lamps "2L" and "2R" turned on between the direction indicating operation and the hazard operation can be reduced. In addition, the difference in the brightness of the first and second direction indicating lamps "2L" and "2R" turned on between the direction indicating operation and the hazard operation decreases as the first resistance comes closer to twice the second resistance.

Although an embodiment of the present invention has been described in detail, the present invention is not limited to the specific configurations according to the embodiment described above, and various modifications can be made without departing from the spirit of the present invention.

For example, a P-type MOS transistor can be used instead of the N-type MOS transistor "NM1". In that case, the bootstrap circuit 1 can be omitted.

Furthermore, the number of the LED elements included in each of the left-front direction indicating lamp "2LF", the left-rear direction indicating lamp "2LR", the right-front direction indicating lamp "2RF" and the right-rear direction indicating lamp "2RR" is not limited to three.

DESCRIPTION OF SYMBOLS 1 bootstrap circuit
SW1 direction indicating switch
SW2 hazard switch
2L first direction indicating lamp
2R second direction indicating lamp
3 internal power supply
4 pulse signal generating part
4a oscillator
4b pulse signal generating circuit
5 variable resistor circuit
6 voltage detecting part
7 lighting status detecting part
R1 first resistor
R2 second resistor
R3 third resistor
R4 resistor
R5 resistor
D1 diode
C1 capacitive element
NM1 N-type MOS transistor (a first switching element)
PM1 P-type MOS transistor (a second switching element)
Q1 NPN-type transistor (a third switching element)
Q2 NPN-type transistor (a fourth switching element)

The invention claimed is:
1. A direction indicating apparatus, comprising:
a pulse signal generating part that generates a pulse signal;
a first switching element having a first end to which a power supply voltage is supplied, a control terminal to which the pulse signal is supplied and a second end at which a drive current having a magnitude responsive to an amplitude of the pulse signal is output;
a variable resistor circuit that is connected to the second end of the first switching element at a first end thereof and is capable of switching a resistance between a first resistance and a second resistance, the second resistance being lower than the first resistance;
a direction indicating switch that has a first terminal, a second terminal and a third terminal and is capable of switching among a state where the first terminal and the second terminal are electrically connected to each other, a state where the first terminal and the third terminal are electrically connected to each other and a state where the first terminal, the second terminal and the third terminal are electrically separated from each other, the first terminal being connected to the second end of a variable resistor circuit;
a hazard switch that is capable of switching between an on state where the first terminal, the second terminal and the third terminal of the direction indicating switch are electrically connected to each other and an off state where the first terminal, the second terminal and the third terminal are electrically separated from each other;
a first direction indicating lamp that includes a first LED element, is connected to the second terminal at a first end thereof and to a ground at a second end thereof and is turned on when a current flows therethrough;
a second direction indicating lamp that includes a second LED element, is connected to the third terminal at a first end thereof and to the ground at a second end thereof and is turned on when a current flows therethrough;
a voltage detecting part that detects a detection voltage between the ends of the variable resistor circuit and makes the pulse signal generating part control the amplitude of the pulse signal so as to bring the detection voltage responsive to a pulse wave of the pulse signal close to a preset target voltage value; and
a lighting status detecting part that detects lighting status of the first direction indicating lamp and the second direction indicating lamp and switches the resistance of the variable resistor circuit to the second resistance when both the first direction indicating lamp and the second direction indicating lamp are turned on and switches the resistance of the variable resistor circuit to the first resistance when any of the first direction indicating lamp and the second direction indicating lamp is turned on.

2. The direction indicating apparatus according to claim 1, wherein the first resistance is set to be twice as high as the second resistance.

3. The direction indicating apparatus according to claim 1, wherein the variable resistor circuit has:
   a first resistor connected to the second end of the first switching element at a first end thereof;
   a second resistor connected to a second end of the first resistor at a first end thereof and to the first terminal of the direction indicating switch at a second end thereof; and
   a second switching element that electrically connects the ends of the first resistor to each other when the second switching element is turned on, and electrically separates the ends of the first resistor from each other when the second switching element is turned off, and
   the resistance of the variable resistor circuit is the first resistance when the second switching element is turned off, and is the second resistance when the second switching element is turned on.

4. The direction indicating apparatus according to any of claim 1, wherein the lighting status detecting part detects that the first direction indicating lamp is turned on if a voltage at the first end of the first direction indicating lamp is equal to or higher than a first threshold voltage, detects that the first direction indicating lamp is not turned on if the voltage at the first end of the first direction indicating lamp is lower than the first threshold voltage, detects that the second direction indicating lamp is turned on if a voltage at the first end of the second direction indicating lamp is equal to or higher than a preset second threshold voltage and detects that the second direction indicating lamp is not turned on if the voltage at the first end of the second direction indicating lamp is lower than the second threshold voltage.

5. The direction indicating apparatus according to claim 4, wherein the second switching element is a P-type MOS transistor having a source connected to the first end of the first resistor and a drain connected to the second end of the first resistor, and
   the lighting status detecting part has:
   a third resistor connected to the source of the P-type MOS transistor at a first end thereof and to a gate of the P-type MOS transistor at a second end thereof;
   a third switching element that has a first end connected to the second end of the third resistor and a control terminal connected to the first end of the second direction indicating lamp and is turned on when the voltage at the first end of the second direction indicating lamp is equal to or higher than the second threshold voltage; and
   a fourth switching element that has a first end connected to a second end of the third switching element, a control terminal connected to the first end of the first direction indicating lamp and a second end grounded and is turned on when the voltage at the first end of the first direction indicating lamp is equal to or higher than the first threshold voltage.

* * * * *